(12) United States Patent
Hisamatsu

(10) Patent No.: US 6,926,453 B2
(45) Date of Patent: Aug. 9, 2005

(54) PHOTOGRAPHY DEVICE HAVING A LENS BARRIER

(75) Inventor: Koji Hisamatsu, Saitama-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/781,899

(22) Filed: Feb. 20, 2004

(65) Prior Publication Data

US 2004/0165881 A1 Aug. 26, 2004

(30) Foreign Application Priority Data

Feb. 20, 2003 (JP) ........................................ 2003-042487

(51) Int. Cl.[7] .............................................. G03B 17/04
(52) U.S. Cl. ...................................... 396/349; 396/448
(58) Field of Search ................................ 396/348, 349, 396/448, 535, 540

(56) References Cited

U.S. PATENT DOCUMENTS

| | | | |
|---|---|---|---|
| 4,736,219 A | * | 4/1988 | Yamanaka et al. .......... 396/540 |
| 5,051,765 A | | 9/1991 | Yoshizaki et al. |
| 5,508,769 A | | 4/1996 | Inoue et al. |
| 6,450,708 B1 | * | 9/2002 | Takanashi .................... 396/448 |
| 2004/0165108 A1 | * | 8/2004 | Okuda ......................... 348/375 |

FOREIGN PATENT DOCUMENTS

| | | |
|---|---|---|
| JP | 7-49515 A | 2/1995 |
| JP | 2712160 B2 | 10/1997 |
| JP | 3078408 B2 | 6/2000 |

* cited by examiner

Primary Examiner—David M. Gray
(74) Attorney, Agent, or Firm—Sughrue Mion, PLLC (57) ABSTRACT

A photography device with a simple structure which is capable of implementing simple operations for opening and closing a lens barrier without risk of damaging or breaking the lens barrier or a lens barrel. When a grip switch is moved to an on position for turning power on, a slide plate moves to an on position, a rotating arm rotates interlockingly therewith, and the lens barrier moves to an open position. Hence, a stopper piece of a stopper member engages with an engaging piece of the rotating arm, and blocks rotation thereof. When, due to retraction of a lens for photography, a boss is contacted with a tapering surface by rotation of the lens barrel, a stopper-urging member is moved, the stopper piece is separated from the engaging piece, the rotating arm is rotated by urging force of an arm-urging spring, and the lens barrier moves to a closed position.

11 Claims, 7 Drawing Sheets

PHOTOGRAPHY DEVICE HAVING A LENS BARRIER

CROSS-REFERENCE TO RELATED APPLICATION

This application claims priority under 35USC 119 from Japanese Patent Application No. 2003-042487, the disclosure of which is incorporated by reference herein.

BACKGROUND OF THE INVENTION

1. Field of the Invention

The present invention relates to a photography device.

2. Description of the Related Art

Among photography devices in which a lens for photography is protruded through a protrusion aperture of a casing body, there are photography devices which are structured such that the protrusion aperture is covered by a lens barrier when the lens for photography is retracted into the casing body (stored).

For example, Japanese Patent No. 2,712,160 discloses a camera which is equipped with an urging mechanism and an operation mechanism. The urging mechanism urges the lens barrier in a closing direction. The operation mechanism moves the lens barrier to an open position, against urging force from the urging mechanism, and retains the lens barrier. Accordingly, operations to open and close the lens barrier are implemented simply and safely.

However, in an operation to close the lens barrier, the lens barrier temporarily abuts against a peripheral surface of a lens barrel and movement toward the closed position is obstructed. Thereafter, when the barrel has moved to a camera body side end of the movement thereof, the lens barrier is closed by the urging force from the urging mechanism. In this operation, because the lens barrier abuts against the lens barrel, there is a risk that damage or breakage may occur.

Similarly, in a retraction-type camera disclosed in Japanese Patent No. 3,078,408, when a barrier is being moved from a completely open position to a completely closed position, a trigger switch operates and a lens barrel starts to retract. When the barrier is moved further in the closing direction, clicking means operates, prompting a user to wait until the lens barrel has completely retracted. Then, when the retraction has completely finished and it is possible for the barrier to completely close, the barrier is moved so as to pass over the clicking means, and is completely closed.

In this structure, although impacts between the barrier and the lens barrel can be avoided at least, movement of the barrier is temporarily stopped at an intermediate position during complete closing of the barrier. Thus, there is a problem in that operability is poor.

Japanese Patent Application Laid-Open (JP-A) No. 7-49515 discloses a camera (lens device) which is equipped with a motor for implementing protrusion and withdrawal of a moveable barrel, and which is structured so as to rotate a lens barrier for closing while the moveable barrel is being withdrawn.

With this structure, a mechanism for transmitting driving force of the motor to the lens barrier is necessary, and there is a disadvantage in that the structure is complicated.

SUMMARY OF THE INVENTION

An object of the present invention is to provide a photography device with a simple structure, which is capable of implementing simple operations for opening and closing a lens barrier without any risk of damaging or breaking the lens barrier, a lens barrel or the like.

According to an aspect of the present invention, in order to achieve the above-mentioned object, a photography device is provided which includes: a lens; a casing body including an aperture for protrusion and storage of the lens; a lens barrier which is moveable between an open position for opening the aperture and a closed position for closing the aperture; a lens barrier-urging member which continuously urges the lens barrier toward the closed position; and a stopper member which can lock the lens barrier when the lens barrier is at the open position, and which, at a time of lens storage, can move in accordance with the storage and release the locking for allowing movement of the lens barrier toward the closed position due to the urging of the lens barrier-urging member.

DETAILED DESCRIPTION OF THE INVENTION

Figure 1:
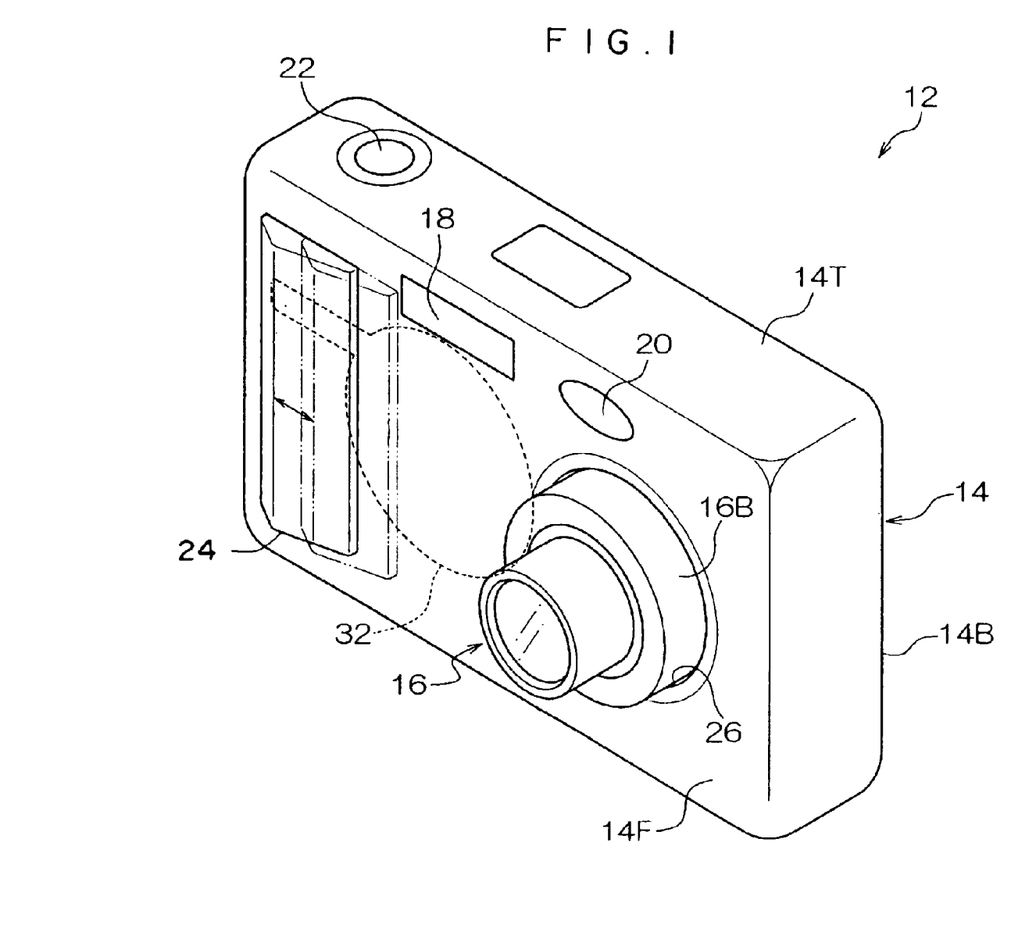
FIG. 1 is a perspective view showing a digital still camera of an embodiment of the present invention.

FIG. 1 shows a digital still camera (below referred to simply as a camera) 12, which is a portable device, of an embodiment of the present invention.

The camera 12 includes a substantially box-like casing body 14. The casing body 14 is equipped, at a front face 14F thereof, with a grip switch 24, a lens for photography 16, a protrusion aperture 26, a light-emitting member for photography (a "flash") 18, a viewfinder light-receiving portion 20 and the like. At an upper face 14T of the casing body 14, a release button 22 is provided. At a rear face 14B, a liquid crystal display, an operation button, a viewfinder and the like (none of which are shown here) are provided.

The grip switch 24 can slide between an on position, which is shown by solid lines in FIG. 1, and an off position (a position shown by broken lines in FIG. 1). When the grip switch 24 is at the on position, a power supply of the camera 12 is turned on.

The grip switch 24 is moved to the on position and the camera 12 is turned on by, for example, a camera user. While viewing an image on the liquid crystal display (or an image in the viewfinder at the back face), the user can perform camera photography by pushing the release button 22. Further, the grip switch 24 is structured to be capable of functioning as a grip for the camera 12 when at the on position.

As shown in detail in FIGS. 2 to 7, a fixed plate 28 is provided inside the casing body 14. The fixed plate 28 has an aperture 30 at a position which corresponds to the protrusion aperture 26 of the casing body 14. The lens for photography 16 passes through this aperture 30 and the protrusion aperture 26, and protrudes to the outside.

The protrusion aperture 26 (and the aperture 30) is opened and closed by a lens barrier 32.

The fixed plate 28 has a long hole 34, which extends along a lateral direction of the camera. Two pins 38 of a guide arm 36, which protrudes from the lens barrier 32, fit into this long hole 34.

The lens barrier 32 is capable of sliding movement along the long hole 34 relative to the fixed plate 28. More specifically, the lens barrier 32 can slidingly move between a closed position (see FIGS. 2 and 3), which completely closes the protrusion aperture 26 (and the aperture 30), and an open position (see FIGS. 4 and 5), which completely opens the same.

A sliding plate 40 is attached to the fixed plate 28 so as to be slideable in the same direction as the direction of sliding of the lens barrier 32. The grip switch 24 (see FIG. 1) is fixed to the sliding plate 40.

A rotating arm 42 is attached to a lower portion of the fixed plate 28 to be rotatable about a fixed shaft 44. A long hole 46 is formed at a vicinity of a free end of the rotating arm 42. One of the pins 38 of the guide arm 36 is accommodated in this long hole 46. Thus, the lens barrier 32 slides in accordance with rotation of the rotating arm 42.

An arm-urging spring 48 is attached to the sliding plate 40. The arm-urging spring 48 urges a pin 50, which is provided at a vicinity of the rotating arm 42 near the fixed shaft 44, in the direction of arrow R (that is, a direction of movement of the lens barrier 32 to the closed position).

A substantially rectangular aperture 62, which is longer than a movement stroke of the sliding plate 40, is formed at a lower portion of the sliding plate 40. The pin 50 of the rotating arm 42 is inserted into the aperture 62.

When the sliding plate 40 moves from an off position thereof to an on position thereof, an inner periphery (aperture edge) of the aperture 62 pushes the pin 50 and causes the rotating arm 42 to rotate. As a result, the lens barrier 32 moves from the closed position to the open position (see FIG. 5).

In contrast, when the sliding plate 40 moves from the on position to the off position, the inner periphery of the aperture 62 does not push the pin 50 so as to cause the rotating arm 42 to rotate.

A support shaft 64 is provided standing from the fixed plate 28. A stopper member 66 is mounted at the support shaft 64 so as to be slideable between a position which is separated from the fixed plate 28 (see FIG. 2) and a position which is close to the fixed plate 28 (see FIG. 4).

A stopper-urging spring 68 is fitted on the support shaft 64. The stopper-urging spring 68 continuously urges the stopper member 66 in a direction of approaching the fixed plate 28 (the direction of arrow L).

The stopper member 66 includes a stopper piece 70, which extends in parallel with a length direction of the support shaft 64. When the stopper member 66 is at the position which is close to the fixed plate 28 (a locking position) and the lens barrier 32 is at the open position, the stopper piece 70 engages with an engaging piece 72, which is formed at the rotating arm 42, and blocks rotation of the rotating arm 42 in the direction of arrow R (see FIG. 3).

Figure 2:
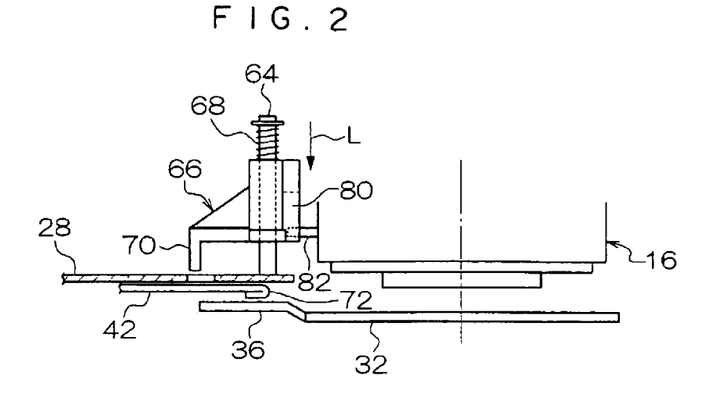
FIG. 2 is a plan view of internal structure of the camera of the present embodiment, in which a slide plate is disposed at an off position and a lens barrier has closed a protrusion opening.

If the stopper member 66 has moved to the position which is separated from the fixed plate 28, the stopper piece 70 is disposed at a position (an unlocking position) which does not engage with the engaging piece 72 (see FIG. 2). When the stopper piece 70 is at this unlocking position, rotation of the rotating arm 42 is not blocked.

Figure 10:
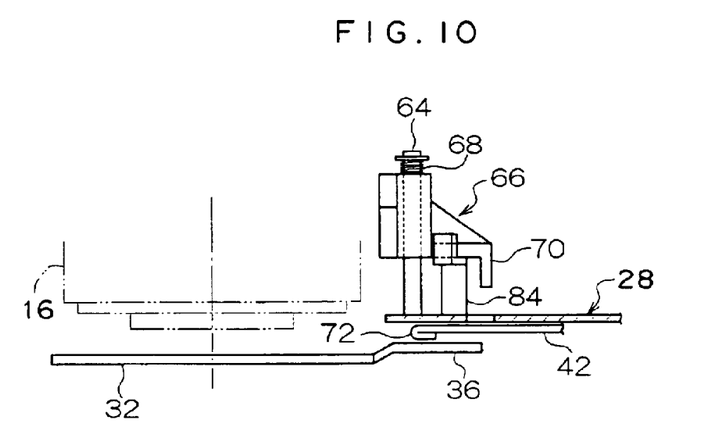
FIG. 10 is a view seen from a lower face side of the internal structure of the camera of the present embodiment, in which the stopper member has been withdrawn for assembly of a lens.

As shown in FIG. 10, the stopper member 66 can move further from the unlocking position in a direction opposite to the direction of arrow L, and can reach an assembly position, which is discussed later.

Figure 3:
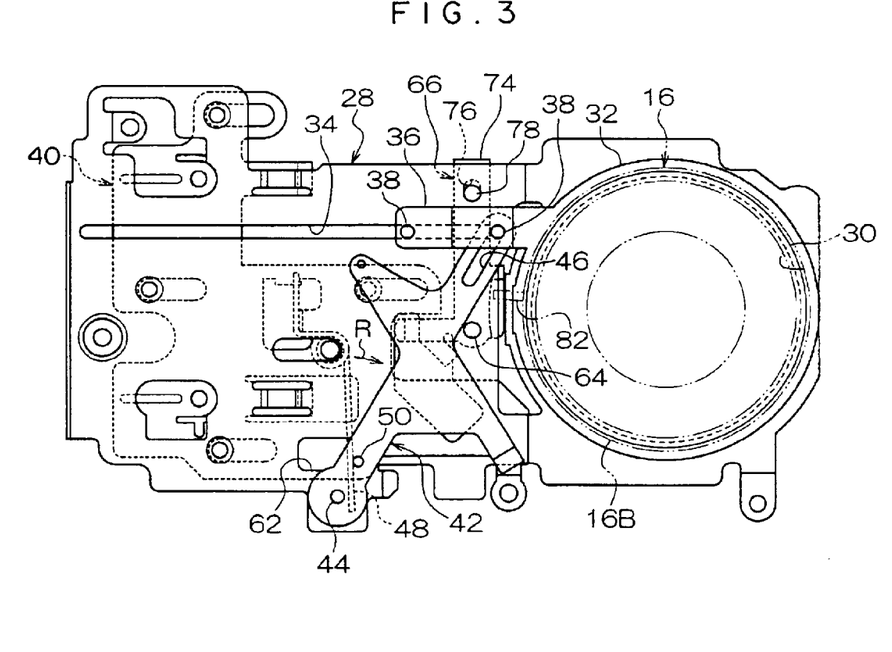
FIG. 3 is a front view of the internal structure shown in FIG. 2.
Figure 4:
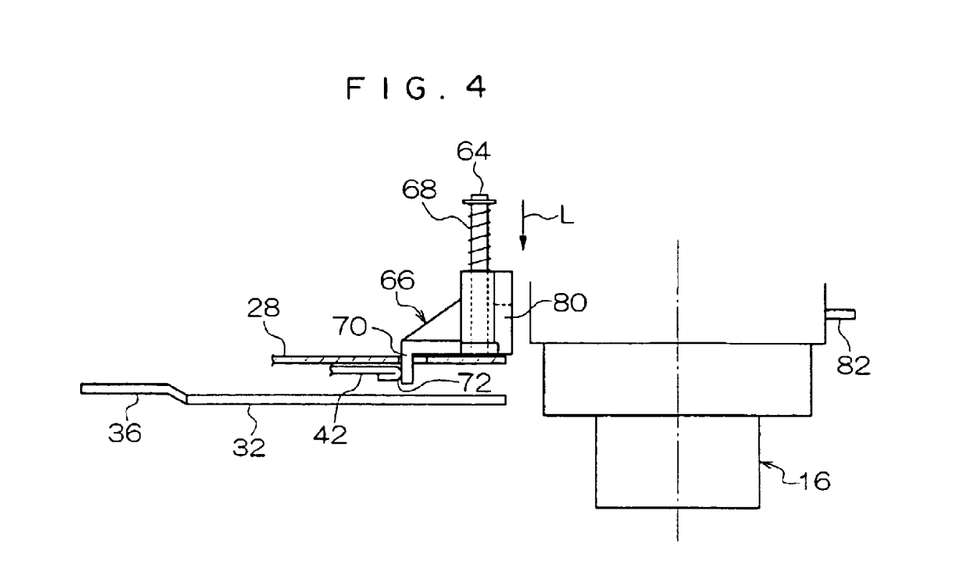
FIG. 4 is a plan view of the internal structure of the camera of the present embodiment, in which the slide plate is disposed at an on position and the lens barrier has opened the protrusion opening.
Figure 5:
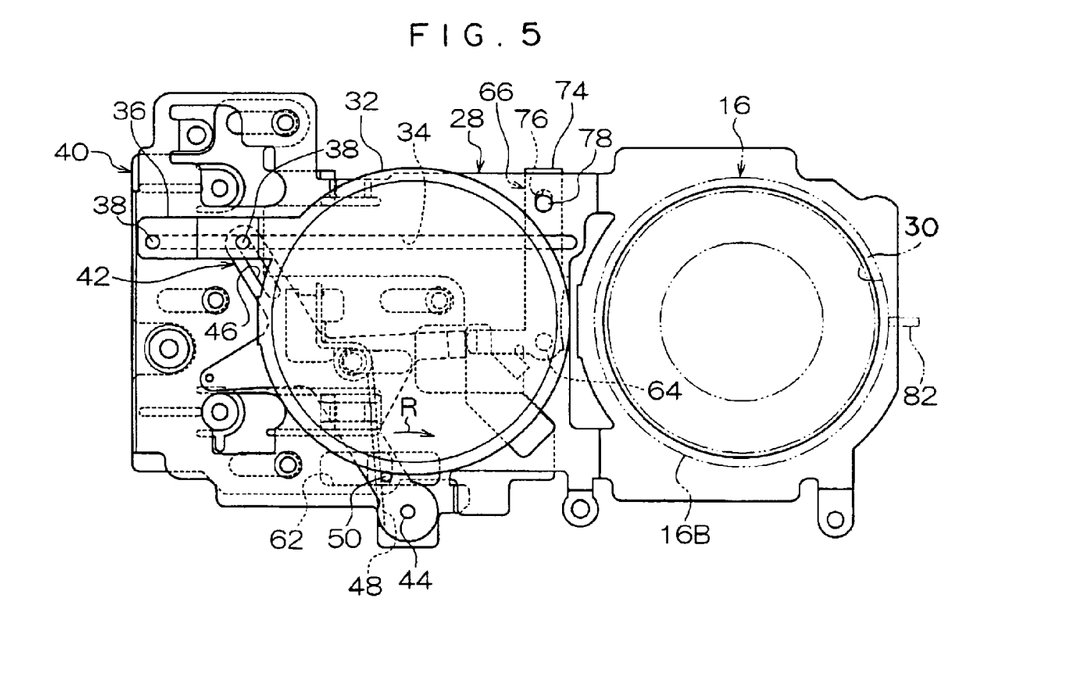
FIG. 5 is a front view of the internal structure shown in FIG. 4.
Figure 6:
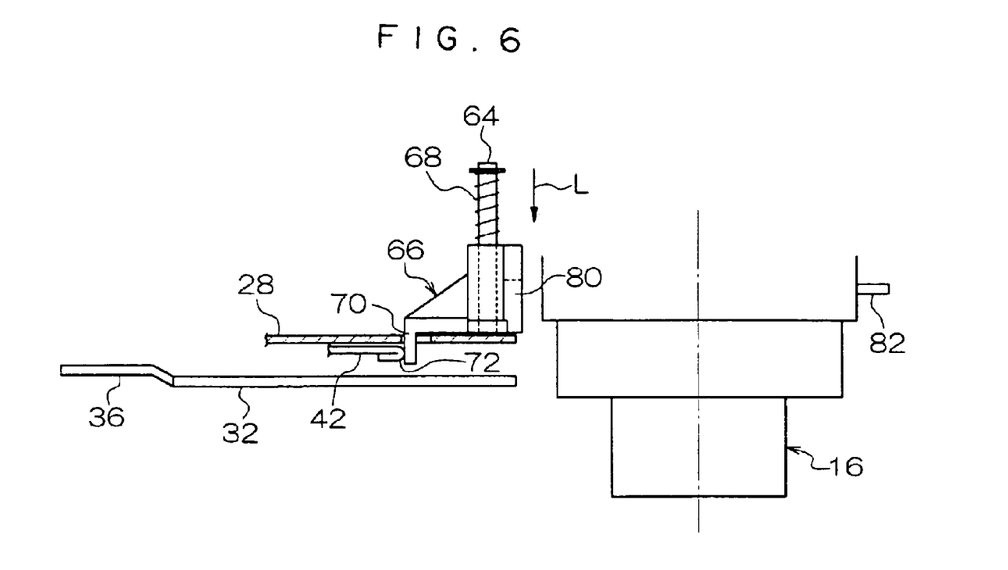
FIG. 6 is a plan view of the internal structure of the camera of the present embodiment, in which the slide plate is disposed at the off position and the lens barrier has opened the protrusion opening.
Figure 7:
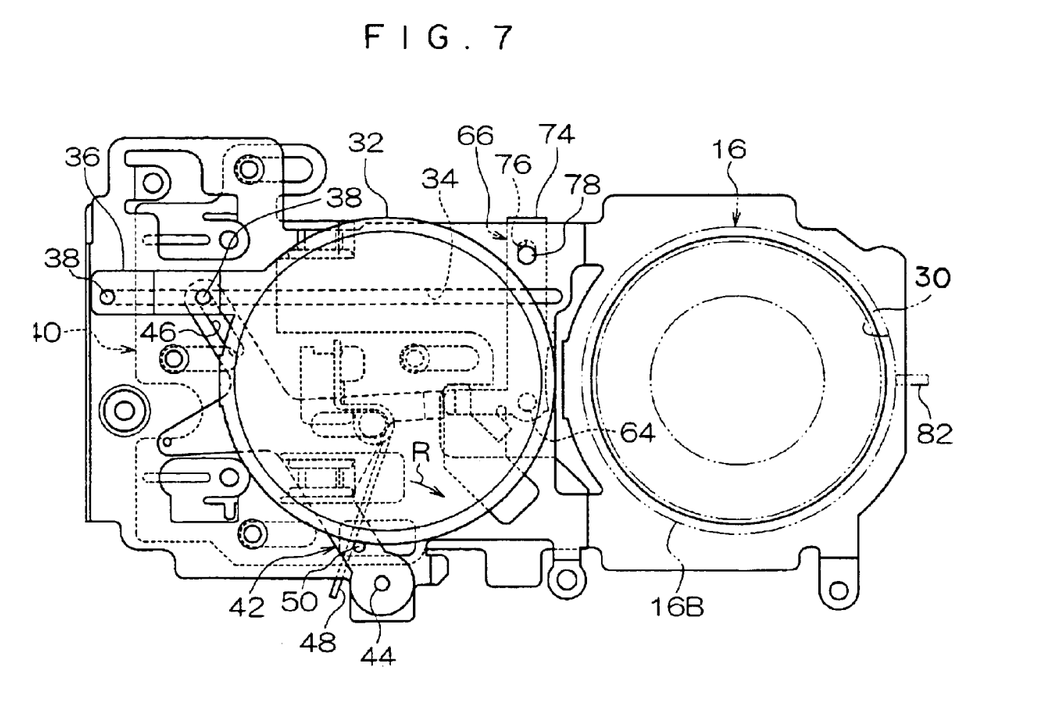
FIG. 7 is a front view of the internal structure shown in FIG. 6.

The stopper member 66 includes a guiding arm 74, which extends upward (see FIG. 3). The guiding arm 74 features a guiding hole 76 at a distal end vicinity thereof. A guidance pin 78, which is provided protruding from the fixed plate 28, is inserted into the guiding hole 76.

The guidance pin 78 has a length such that the guidance pin 78 is accommodated in the guiding hole 76 when the stopper member 66 is moving between the locking position and the unlocking position and such that the guidance pin 78 is removed from the guiding hole 76 if the stopper member 66 further moves to the assembly position.

Therefore, the stopper member 66 is guided to slide between the locking position and the unlocking position without rotating, but becomes able to rotate about the support shaft 64 between the unlocking position and the assembly position.

Figure 8:
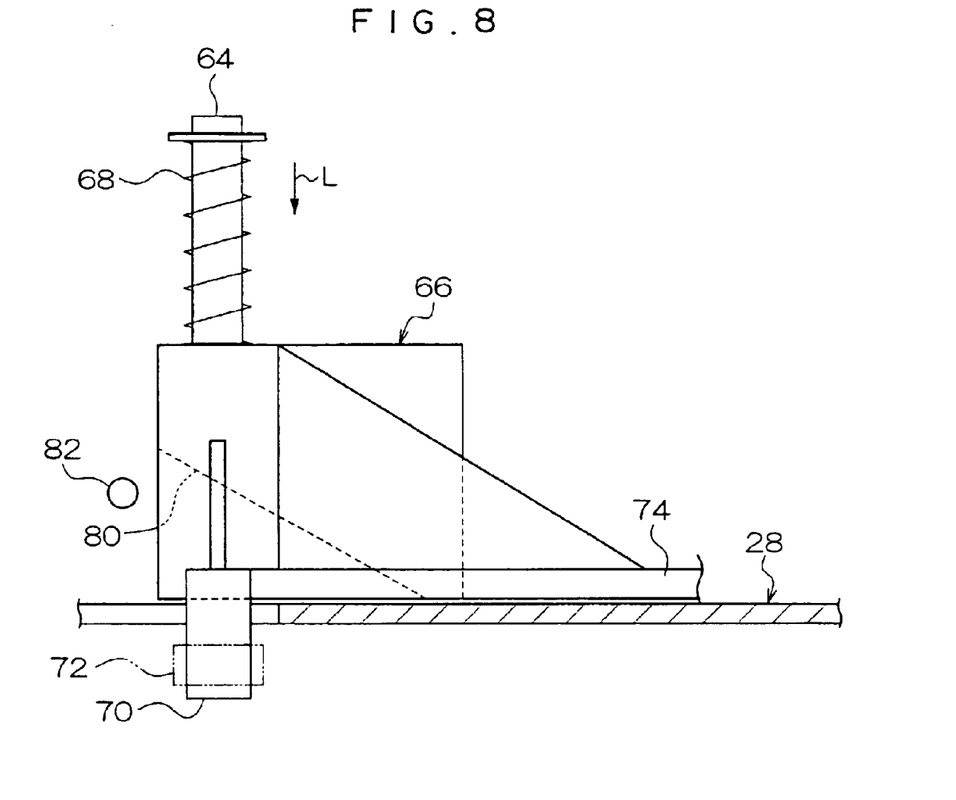
FIG. 8 is an enlarged plan view of a stopper member, which is locked.
Figure 9:
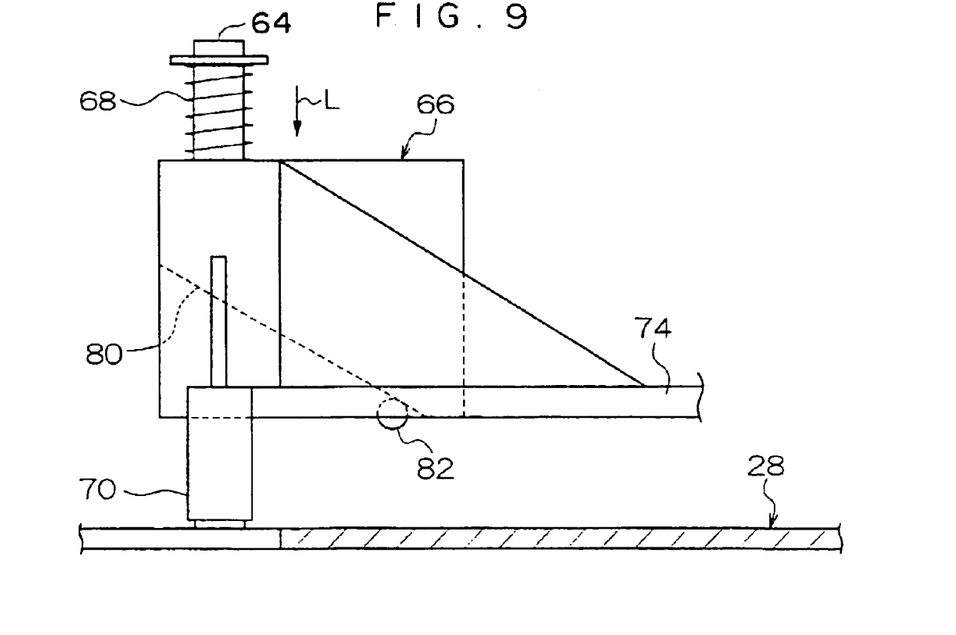
FIG. 9 is an enlarged plan view of the stopper member, locking of which has been released.

A tapering surface 80, which is angled toward the fixed plate 28, is formed at a portion of the stopper member 66 which opposes the lens for photography 16 (see FIGS. 8 and 9).

A boss 82 is provided protruding from a lens barrel 16B of the lens for photography 16 (see FIG. 1). The boss 82 rotates in a circumferential direction integrally with the lens barrel 16B at a time of protrusion.

The boss 82 and the tapering surface 80 do not substantially engage (contact) in a power-on state (during photography or at times of photography). However, the boss 82 and the tapering surface 80 do engage in a power-off state, in which the grip switch 24 has been moved to the off position. That is, the boss 82 is pushed against the tapering surface 80 by an operation for retraction of the lens for photography 16, and causes the stopper member 66 to move to the unlocking position against the urging force of the stopper-urging spring 68.

As shown in FIG. 10, a retaining piece 84 is provided standing from the fixed plate 28.

If the stopper member 66 rotates such that the tapering surface 80 moves away from the lens barrel 16B, a portion of the stopper piece 70 rides up on the retaining piece 84.

Figure 11:
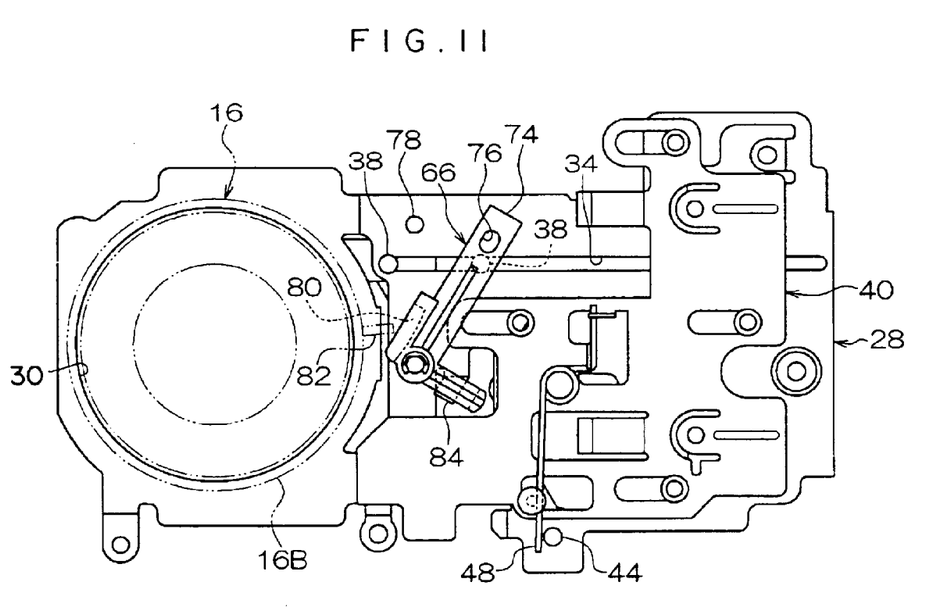
FIG. 11 is a view of the internal structure shown in FIG. 10, viewed from a rear face side thereof.

As a result, the stopper member 66 is retained at a position at which the tapering surface 80 is separated from the lens barrel 16B (see FIG. 11). That is, at a time of assembly of the lens for photography 16, the stopper member 66 is retained at a position which is withdrawn from a region in which the lens for photography 16 may move (i.e., the assembly position).

Below, a work operation for assembling the lens for photography 16 to the camera 12 of the present embodiment and operations of the camera 12 of the present embodiment will be described.

Prior to assembly of the lens for photography 16 to the camera 12, the fixed plate 28 is put into a state of being fixed to the casing body 14, the stopper member 66 is moved to the assembly position, and the stopper piece 70 is caused to ride up on the retaining piece 84 (see FIGS. 10 and 11).

At this time, because the tapering surface 80 of the stopper member 66 is separated from the boss 82, and the tapering surface 80 and boss 82 do not interfere, the assembly operation can be carried out with ease.

Figure 12:
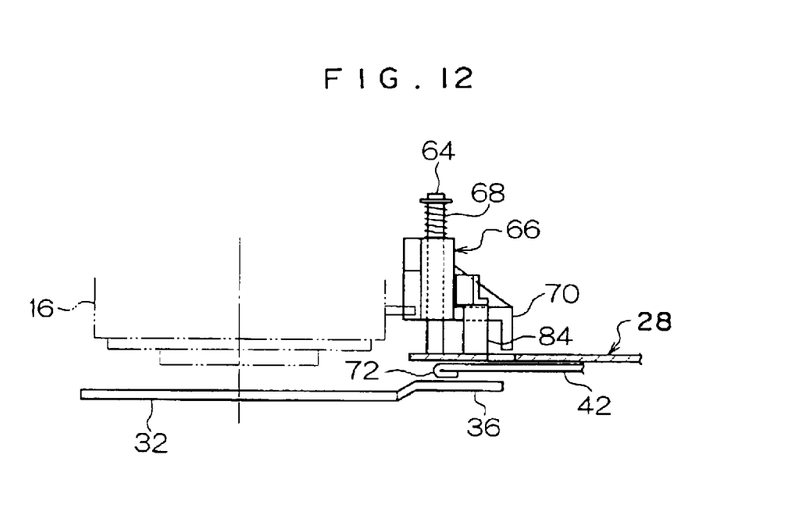
FIG. 12 is a view seen from the lower face side of the internal structure of the camera of the present embodiment, in which the stopper member has been returned.
Figure 13:
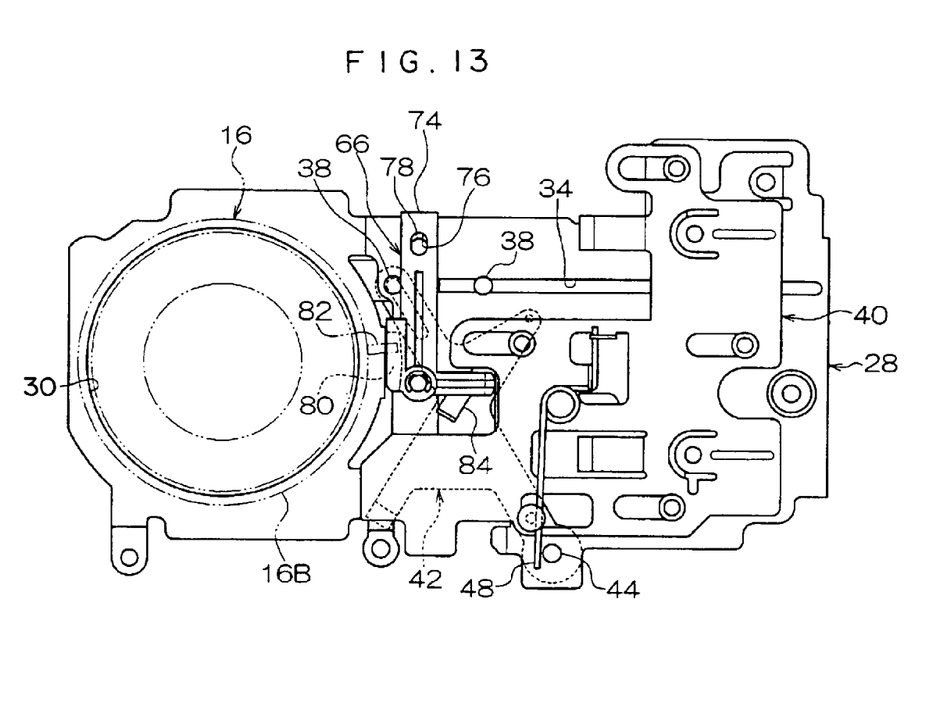
FIG. 13 is a view of the internal structure shown in FIG. 12, viewed from a rear face side thereof.

After assembly of the lens for photography 16, the stopper member 66 is rotated and the retention by the retaining piece 84 is released (see FIG. 13). The stopper member 66 is subject to the urging force of the stopper-urging spring 68, and moves in the direction of approaching the fixed plate 28 (the direction of arrow L) (see FIG. 12).

During use of the camera, in order to set the power-on state, a user moves the grip switch 24, which is disposed at the off position (as shown by broken lines in FIG. 1), to the on position (as shown by solid lines in FIG. 1). In accordance therewith, the sliding plate 40 moves from the off position thereof to the on position, and the inner periphery of the aperture 62 pushes the pin 50. As a result, the rotating arm 42 rotates in a direction opposite to the direction of arrow R (see FIG. 3). Hence, the lens barrier 32 moves to the open position, and the protrusion aperture 26 and aperture 30 are opened up (see FIGS. 4 and 5).

Thus, by a simple user operation of merely moving the grip switch 24 to the on position, the lens barrier 32 is moved and the protrusion aperture 26 and aperture 30 are opened up. As a result, protrusion of the lens for photography 16 is enabled.

Accordingly, the lens for photography 16 can be protruded (by a desired amount), for example, in accordance with a predetermined sequence or when a user presses a predetermined button or the like.

In this protrusion-enabled state, the stopper piece 70 of the stopper member 66, which is maintained at the locking position by the urging force of the stopper-urging spring 68, engages with the engaging piece 72 of the rotating arm 42 (see FIG. 4) and blocks rotation of the rotating arm 42 in the direction of arrow R (see FIG. 3). That is, a situation in which the rotating arm 42 is inadvertently rotated by the urging force of the arm-urging spring 48 will not occur. Thus, the lens barrier 32 is reliably retained at the open position.

When photography is finished, the grip switch 24 is moved from the on position to the off position. As a result, the sliding plate 40 moves to the off position thereof (see FIGS. 6 and 7). At this time, because the inner periphery of the aperture 62 does not push against the pin 50, the rotating arm 42 does not rotate. That is, the lens barrier 32 is kept disposed at the open position.

Then, the lens for photography 16 is retracted into the camera 12. The boss 82 is brought into contact with the tapering surface 80 by rotation of the lens barrel 16B, and the boss 82 moves the stopper member 66 to the unlocking position against the urging force of the stopper-urging spring 68. Thus, the stopper piece 70 is separated from the engaging piece 72 (see FIG. 9).

The rotating arm 42 is rotated in the direction of arrow R by the urging force of the arm-urging spring 48, and the lens barrier 32 is moved from the open position to the closed position.

Thus, the lens barrier 32 can be easily moved from the open position to the closed position merely by a simple operation of moving the grip switch 24 from the on position to the off position.

In other words, with the camera 12 of the present embodiment, operations to open and close the lens barrier 32 can be implemented merely with single simple operations of moving the grip switch 24, and operability can be dramatically improved. Moreover, because a drive source such as a motor or the like is not necessary for movement of the lens barrier 32, structural simplification is enabled.

Further, because the lens barrier 32 does not move to the closed position until the lens for photography 16 is retracted, the lens barrier 32 does not abut against the lens barrel 16B of the lens for photography 16, and the lens barrier 32, the lens barrel 16B and the like will not be damaged or broken.

The present invention is not limited to the structure described above. For example, an ordinary sliding switch may be employed instead of the illustrated grip switch. A sliding switch may be provided at the upper face of the casing body, a bottom face of the casing body or the like.

The present invention is applicable to, for example, silver halide photography cameras, moving image photography devices which are capable of capturing moving images (such as video cameras), etc.

What is claimed is:

1. A photography device comprising:
   a lens;
   a lens barrel having a protrusion;
   a casing body including an aperture for protrusion and storage of the lens;
   a lens barrier which is moveable between an open position for opening the aperture and a closed position for closing the aperture;
   a lens barrier-urging member which continuously urges the lens barrier toward the closed position; and
   a stopper member which can lock the lens barrier when the lens barrier is at the open position, and which, at a time of lens storage, can move to release the lens barrier and allow the lens barrier to be moved toward the closed position due to the lens barrier-urging member,
   wherein the protrusion is disposed to rotate and abut a portion of the stopper member to release the lens barrier.

2. The photography device of claim 1, further comprising a manual grip switch for turning power on and off.

3. The photography device of claim 2, wherein the grip switch is moveable at least between a power-on position and a power-off position.

4. The photography device of claim 3, wherein the lens barrier moves to the open position in accordance with movement of the grip switch toward the power-on position.

5. The photography device of claim 3, wherein the stopper member allows the movement of the lens barrier toward the closed position in accordance with movement of the grip switch toward the power-off position and storage of the lens.

6. The photography device of claim 1, further comprising a movement member, wherein the lens barrier-urging member urges the lens barrier via the movement member, and the stopper member locks and releases the locking via the movement member.

7. The photography device of claim 5, wherein the movement member comprises a rotating arm which rotates in two opposing directions.

8. The photography device of claim 1, wherein the stopper member is moveable at least between a locking position for locking the lens barrier and a lock-release position for releasing the locking.

9. The photography device of claim 8, wherein the protrusion comprises a boss which pushes the stopper member to the lock-release position at the time of lens storage.

10. The photography device of claim 1, further comprising a retaining member which, at a time of replacement of the lens, retains the stopper member at a withdrawn position which does not interfere with a lens movement region.

11. A photography device comprising:
   a lens;
   a casing body including an aperture for protrusion and storage of the lens;
   a lens barrier which is moveable between an open position for opening the aperture and a closed position for closing the aperture;
   a lens barrier-urging member which continuously urges the lens barrier toward the closed position;
   a stopper member which can lock the lens barrier when the lens barrier is at the open position, and which, at a time of lens storage, can move in accordance with the storage and release the locking for allowing movement of the lens barrier toward the closed position due to the urging of the lens barrier-urging member; and
   a manual grip switch for turning power on and off,
   wherein the grip switch is moveable at least between a power-on position and a power-off position,
   wherein the stopper member allows the movement of the lens barrier toward the closed position in accordance with movement of the grip switch toward the power-off position and storage of the lens, and
   wherein the movement member comprises a rotating arm which rotates in two opposing directions.

* * * * *